(12) United States Patent
Tjin

(10) Patent No.: US 7,466,879 B2
(45) Date of Patent: Dec. 16, 2008

(54) FIBER OPTIC FORCE SENSOR FOR MEASURING SHEAR FORCE

(75) Inventor: Swee Chuan Tjin, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 10/557,590

(22) PCT Filed: May 5, 2004

(86) PCT No.: PCT/SG2004/000118

§ 371 (c)(1), (2), (4) Date: May 11, 2007

(87) PCT Pub. No.: WO2004/104539

PCT Pub. Date: Dec. 2, 2004

(65) Prior Publication Data

US 2007/0280583 A1    Dec. 6, 2007

(30) Foreign Application Priority Data

May 22, 2003   (SG)  .............................. 200302912-1

(51) Int. Cl.
G02B 6/00   (2006.01)

(52) U.S. Cl. .............................. 385/13; 385/12; 385/15; 385/31; 385/37

(58) Field of Classification Search .................... 385/12, 385/13, 15, 31, 37
See application file for complete search history.

(56) References Cited

U.S. PATENT DOCUMENTS

| 5,399,854 A | 3/1995 | Dunphy et al. |
| 5,770,155 A | 6/1998 | Dunphy et al. |
| 7,027,672 B2 * | 4/2006 | Tjin ............................. 385/13 |
| 2005/0163414 A1 * | 7/2005 | Takeya et al. ................. 385/12 |

FOREIGN PATENT DOCUMENTS

WO    WO 02/46712    6/2002

OTHER PUBLICATIONS

International Search Report for PCT/SG2004/000118.

* cited by examiner

*Primary Examiner*—Jennifer Doan
(74) *Attorney, Agent, or Firm*—Foley & Lardner LLP

(57) ABSTRACT

Provided herein are fiber optic force sensors for measuring shear force which include an optical fiber with at least one optical core and a Bragg grating. Also provided are fiber optic force sensor arrays for measuring a plurality of shear forces which include an optical fiber with at least one optical fiber core and a plurality of Bragg gratings.

15 Claims, 5 Drawing Sheets

FIBER OPTIC FORCE SENSOR FOR MEASURING SHEAR FORCE

This invention relates to a fiber optic force sensor for measuring shear force.

BACKGROUND OF THE INVENTION

Shear force sensors are used in a wide range of disciplines. For example, they are used as slip sensors in robotic arms, tactile feedback sensors in biomedical engineering or frictional force sensors between two adjacent structural elements in civil engineering.

Different types of shear force sensors are commonly available. Such sensors usually make use of magneto-resistive elements, capacitive elements or semiconductor elements to measure shear forces. In a magneto-resistive sensor, a displacement of an object attached to a magnetic material of the sensor causes a change in the magnetic field. This change in the magnetic field in turn causes a change of resistance of a resistive element in the sensor, which is proportional to the shear force.

In a capacitive sensor, a shear force exerted on the sensor causes the capacitance of a capacitor of the sensor to change. The change of capacitance is proportional to the shear force.

Silicon/semiconductor sensors belong to a new trend of shear sensors using microfabrication technology. This type of sensor make use of piezoresistive effect in silicon for detecting shear force.

All the shear sensors described above are sensitive to Electro-Magnetic Interference (EMI), giving rise to inaccurate shear force readings when EMI is present. Moreover, the maximum shear force that can be exerted on these sensors are in general less than 100 N, making them unsuitable to be used for measuring shear force in heavy structures which may exert a shear force larger than 100 N on the sensor.

Thus it is desirable to have a shear force sensor which is small in size, immune to external interference like EMI and is able to accurately measure even large forces exerted on the sensor.

SUMMARY OF INVENTION

It is an object of the invention to provide a shear force sensor which can operate with high accuracy and sensitivity in a wide range of shear forces including forces well above 100 N.

The object is achieved by the fiber optic force sensor for measuring shear force according to the features of the independent claims. Preferred embodiments of the invention are defined in the dependent claims.

The fiber optic force sensor according to the invention comprises an optical fiber having at least one fiber core. A first portion of the optical fiber is embedded between an upper anchoring layer and an upper protection layer, a second portion of the optical fiber is embedded between a lower anchoring layer and a lower protection layer, and an intermediate portion of the optical fiber is extended between the first and the second portions of the optical fiber. The upper anchoring and protection layers, which constitute a first stack of layers, are arranged above the lower anchoring and protection layers, which constitute a second stack of layers, with the upper anchoring layer directly facing the lower anchoring layer. Therefore, the intermediate portion of the optical fiber extends between the upper and the lower anchoring layers.

In particular, according to the invention, the upper anchoring layer and the lower anchoring layer each has a hole provided through them. The first portion of the optical fiber is threaded through the hole provided in the upper anchoring layer and anchored between the upper protection and anchoring layer, and the second portion of the optical fiber is threaded through the hole provided in the lower anchoring layers and anchored between the lower protection and anchoring layers.

The upper anchoring and protection layers can be moved with respect to the lower anchoring and protection layers, exerting a strain, and thereby causing a change in length, to the intermediate portion of the optical fiber between the anchored first and second portions of the optical fiber.

The optical fiber comprises a Bragg grating incorporated in the fiber core in said intermediate portion of the optical fiber, and is therefore arranged between the anchored first and second portions of the optical fiber. The fiber core has a fiber optical axis and the Bragg grating having a grating optical axis is arranged within the fiber core of the optical fiber such that the grating optical axis is coaxial to the fiber optical axis. The Bragg grating has predetermined optical properties, in particular reflected and transmitted properties, as explained hereafter.

The Bragg grating has a wavelength $\lambda_b$ corresponding to twice its period $\Lambda$, as represented in the following equation:

$$\lambda_b = 2\Lambda n_{\mathit{eff}}$$

wherein $n_{\mathit{eff}}$ is the effective refractive index of the fiber. The phenomenon described by the above equation is known as the Bragg condition, and $\lambda_b$ is known as the Bragg wavelength. Light having the wavelength $\lambda_b$ will be attenuated by the Bragg grating, and light at other wavelengths will be transmitted therethrough without significant attenuation. Therefore, the Bragg grating can be seen to operate as a narrow-band wavelength notch filter.

The Bragg grating is extremely sensitive to any stress or strain applied thereon which will cause its length to change. Any changes in the length of the Bragg grating caused by stress or strain exerted thereon results in a shift of the Bragg wavelength $\lambda_b$ of the Bragg grating.

This wavelength shift can be detected in either a reflected signal or a transmitted signal of an input signal to the optical fiber according to the invention. Since the measured information is wavelength encoded, which is in absolute power, the resultant acquired output signal (i.e. the signal reflected or transmitted by the Bragg grating) does not depend directly on the total light intensity.

According to the invention, a shear movement of the upper protection and anchoring layers with respect to the lower protection and anchoring layers causes a strain to the intermediate portion of the optical fiber between the anchored first and second portions. This results in a change of length in the intermediate portion of the optical fiber and hence a change in length in the Bragg grating contained in the fiber core of the optical fiber.

The change of length of the Bragg grating in the fiber core of the optical fiber causes, in turn, a change in the optical properties, specifically a shift in the Bragg wavelength $\lambda_b$, of the Bragg grating.

The use of Bragg grating in a fiber core of an optical fiber for determining the shear force has the advantage that the shear force can be easily obtained since the optical properties of the Bragg grating change at least substantially in a linear manner in response to strain (i.e. a change of FBG length) exerted on the Bragg grating.

The fiber optic force sensor according to the invention is very small in size compared to any of the existing shear sensors as the Bragg grating length may in general be between 100 micrometers (μm) and several centimeters (cm). Such a small sized shear sensor is thus suitable to be used for measuring shear forces in small devices like electronic circuits or large structures like bridges or buildings.

Furthermore, the shear sensor according to the invention has the advantage that it is not affected by EMI, which is a serious problem present in the existing shear sensors. Furthermore, the use of Bragg grating allows an absolute measurement of the change in optical transmittance and reflection which is independent of other factors like scale resetting and input signal intensity variation that affect many other existing sensors.

Moreover, the sensitivity of the sensor according to the invention was found to be higher when compared to existing capacitive, magneto-resistive and silicon-based shear sensors. The stability of the sensor according to the invention also makes it suitable to be used for long term monitoring of shear forces between adjacent concrete slabs in civil structures.

In an alternative embodiment of the invention, an optical fiber containing a plurality of fiber cores may be used. In this embodiment, one Bragg grating can be arranged in each fiber core. Since the optical properties of these Bragg gratings are used to measure the same shear force, the shear force can be determined by simply obtaining an average value of the results from the change of optical properties of the Bragg gratings. This results in a more accurate reading compared to the case where an optical fiber with only one fiber core is used.

According to a preferred embodiment of the invention, the upper and lower anchoring layers, and the upper and lower protection layers comprise carbon fiber composites. Carbon fiber composites are resistant to environmental changes, low in cost and are easily available. It should be noted that the anchoring and/or protection layers may also comprise other materials, for example, glass fibers.

According to a preferred embodiment of the invention, a deformable layer is arranged between the upper and lower anchoring layers in such a manner that the upper protection and anchoring layers, the deformable layer and the lower protection and anchoring layer altogether constitute a single stack of layers lying one above the other.

In this embodiment of the invention, the intermediate portion of the optical fiber between the anchored first and second portions of the optical fiber is entirely embedded inside the deformable layer. Therefore, if a shear force is exerted on the sensor according to the invention, it is ensured that this force is applied to the Bragg grating incorporated in the intermediate portion of the optical fiber in a uniform manner.

The deformable layer serves as a protection layer for the Bragg grating by keeping the upper and lower anchoring layer at a distant from each other and not crushing the Bragg grating.

Further, the deformable layer also allows the sensitivity of the force sensor to be controlled. In particular, the higher the resistance of the material used for the deformable layer, the lower the sensitivity of the sensor according to the invention. It should be noted that the sensitivity of the sensor according to the invention is the highest when no deformable layer is used, meaning that the intermediate portion of the optical fiber containing the Bragg grating is arranged in a free space between the upper and the lower anchoring layers. When used to measure a shear force between a top and bottom structure, the first stack of layers is attached to the top structure and the second stack of layers is attached to the bottom structure. By this arrangement, the first and the second stacks of layers are kept apart from each other with the intermediate portion of the optical fiber between them.

The sensitivity of the force sensor according to the invention may further be controlled by the thickness of the deformable layer. The force sensor with a thicker deformable level has a higher sensitivity than a force sensor having a thinner deformable level of the same material.

It should also be pointed out that other than the material as such and the thickness of the deformable layer, other parameters which affect the range and sensitivity of the force sensor include, in general, Young's Modulus and Poisson's Ratio of the material as well as the length and the width of the deformable layer.

In a preferred embodiment of the invention, the Bragg grating is arranged in a middle section of the intermediate portion of the optical fiber in the deformable layer so that the center of the Bragg grating is at least substantially at an equal distance from the upper anchoring layer and the lower anchoring layer. In other words, the Bragg grating is arranged in the so-called neutral layer of the single stack of layers of the sensor according to the invention, the neutral layer being in a middle layer position between the upper and lower anchoring layers. This neutral layer arrangement has the advantage that a force having a component perpendicular to the direction of a shear force (i.e. perpendicular to the plane of the layers) exerted on the force sensor would not deform the Bragg grating in the optical fiber and cause a wavelength shift of the Bragg wavelength $\lambda_b$.

Accordingly, when the Bragg grating is arranged in the intermediate portion of the optical fiber nearer to the upper anchoring layer than the lower anchoring layer (non neutral layer), any force exerted perpendicular to the planar surface of the sensor will cause a strain to the Bragg grating, resulting in undesired wavelength shift.

It is to be noted that any kind of material which is able to deform under stress and/or strain can be used for the deformable layer.

A polymeric material is normally used for the deformable layer since the structure of a polymer provides the deformable properties for the deformable layer. It should be noted that any non-polymeric material like metal which exhibit deformable properties can also be used to form the deformable layer according to the invention.

The deformable layer according to a further preferred embodiment of the invention is an elastomer layer. Elastomer is any kind of material that returns to its initial shape and dimensions after being deformed by any stress or strain. The use of the elastomer layer ensures that the Bragg grating gives a reading after the shear force is removed which is the same as the initial reading prior to the application of this force to the Bragg grating. Therefore, the sensor with an elastomer layer as the deformable layer can be used in applications where shear forces are applied intermittently to the sensor, or can be reused in other devices, without having to recalibrate the sensor.

Any kind of elastomer material may be used for the elastomer layer. The choice of elastomer material depends on the desired range and sensitivity of the sensor.

In one further preferred embodiment, the elastomer layer comprises carbon composites. Since the carbon composite layer is resistant to shear force, the sensitivity of such a force sensor is low. However, the maximum force that can be exerted on such a sensor is very high.

According to another further preferred embodiment of the invention, the elastomer layer comprises silicon rubber. Silicon rubber allows a good balance between strength and sensitivity of the sensor, and hence, is suitable to be used in many practical applications. It should be noted that other elastomer material like PPT or butyl rubber may also be used as the elastomer layer according to preferred embodiments of the invention.

Depending on the application of the force sensor according to the invention, a non-elastomer deformable material, like fiber glass or Teflon, can also be used to form the deformable layer if it is not necessary for the deformable layer to return to its original shape and dimensions after a shear force is measured or only an absolute shear force is to be measured.

According to a preferred embodiment of the invention, the intermediate portion of the optical fiber is arranged inside the deformable layer at an angle with respect to the plane of the anchoring layers. When the intermediate portion of the optical fiber is inclined at an angle with respect to the anchoring layers, a shear force causing the deformable layer to deform in a direction which stretches the intermediate portion will cause the intermediate portion to be stretched more compared to the case when the intermediate portion is arranged perpendicularly to the plane of the anchoring layers. Accordingly, the sensitivity of the force sensor according to this embodiment of the invention is increased without changing the material used for the deformable layer.

It should be noted that the force sensor can still produce reliable readings corresponding to shear forces regardless whether the intermediate portion of the optical fiber is stretched or compressed which depends on the direction of the shear force applied on the sensor.

However, a more accurate and predictable reading is obtained when the intermediate portion of the optical fiber is stretched. Therefore in order to obtain a more accurate and reliable reading of a shear force in both directions, two separate optical fibers with a Bragg grating incorporated in each of the intermediate portions of the fiber optics can be used. In this case, the two optical fibers should be arranged at complementary angles with each other, such that when a shear force is applied to the force sensor, the intermediate portion of one of the optical fiber is stretched whereas the intermediate portion of the other optical fiber is compressed. This results in that irrespective of the direction of the shear force, the intermediate portion of one optical fiber is always stretched, the reading of which can then be taken as accurate measurement of the shear force.

In an alternative embodiment of the invention, the deformation layer comprises a first elastomer layer, a partition layer and a second elastomer layer. One advantage of such a multi-layered deformable layer is that it can be used to form a thick deformable layer when a thick single-layered deformable layer is difficult to achieve. A thicker deformable layer results in a higher sensitivity of the force sensor.

Furthermore, the multi-layered deformation layer also has the advantage of reducing hysterisis loss and hence, giving a more accurate and predictable reading corresponding to the shear force to be measured by the force sensor according to the invention.

In this alternative embodiment of the shear sensor according to the invention, the intermediate portion of the optical fiber in the deformable layer is threaded through a further hole provided in the partition layer wherein the portion of the optical fiber in the hole through the partition layer is surrounded by the material of the first and second elastomer layers. This is achieved by dimensioning the diameter of the hole in the partition layer larger that the diameter of the optical fiber. By this arrangement, the hole in the partition layer will not affect or hinder the change of length of the optical fiber, and thereby the Bragg grating accommodated therein, threaded though that hole. This means, in details, that a friction between the edge of the partition layer defining the hole provided therein and the optical fiber can be prevented. Similarly, it can also be prevented that the optical fiber is affixed to that edge of the partition layer during the curing process applied to the single stack of layers when manufacturing the sensor according to the invention. The prevention of such a friction and/or attachment between the optical fiber and the edge of the partition layer defining the hole therein is important in order not to negatively influence the reading of the sensor.

The corresponding parts of the force sensor in this alternative embodiment may comprise the different materials described in the earlier embodiments. Preferably, the material of the first and second elastomer layers is silicon rubber, and the material of the anchoring layers and the protection layers is carbon fiber composites. The advantages of using these materials are the same as already described above.

Further preferably, the first and second elastomer layers have the same thickness, and the portion of the optical fiber comprising the Bragg grating is in the middle section of the intermediate portion of the optical fiber. Therefore, the Bragg grating extends through the further hole and lies with its central portion in the hole within the plane of the partition layer. In this arrangement, the Bragg grating is in the neutral layer as described above, and will not be affected by any force component perpendicular to the shear force exerted on the sensor.

The invention further provides a fiber optic force sensor array for measuring a plurality of shear forces, comprising an optical fiber having at least one fiber core and a plurality of Bragg gratings incorporated into the fiber core of the optical fiber at a corresponding plurality of portions of the optical fiber. The Bragg gratings and the fiber core each have an optical axis wherein all the optical axes are coaxial to one another. Each Bragg grating has different predetermined optical properties.

At each portion of the fiber core of the optical fiber containing each Bragg grating, a first stack of layers comprising an upper protection layer and an upper anchoring layer, and a second stack of layers comprising a lower anchoring layer and a lower protection layer, are provided. The first stack of layers is arranged above the second stack of layers with the upper anchoring layer directly facing the lower anchoring layer.

At each Bragg grating, a first portion of the optical fiber is threaded through a hole provided in the upper anchoring layer to be anchored between the upper anchoring layer and the upper protection layer, and a second portion of the optical fiber is threaded through a hole provided in the lower anchoring layer to be anchored between the lower anchoring layer and the lower protection layer, and the Bragg grating is arranged in an intermediate portion of the optical fiber between the two anchored portions thereof.

In this force sensor array according to the invention, the optical properties of each of the Bragg gratings are set to a different predetermined value. In this way, a plurality of shear forces can be measured using only one single optical fiber and read by a single decoder unit. The capability of having a plurality of Bragg gratings, and hence, having a plurality of shear force sensors on a single strand of optical fiber according to the invention results in a reduction in the cost per measurement point.

With such an arrangement, it is also possible to have a two dimensional matrix of sensing points to both measure the value and position of the shear force at that sensing points.

Preferably, the fiber optic force sensor array further comprises a deformable layer arranged between the upper and lower anchoring layers at least each portions of the optical fiber comprising the Bragg gratings. The advantages of the deformable layer are the same as that provided in the fiber optical force sensor as already described above.

DETAILED DESCRIPTION OF THE PREFERRED EMBODIMENTS OF THE INVENTION

In the following, preferred embodiments of the invention will be described in detail with reference to the accompanying drawings.

Figure 1:
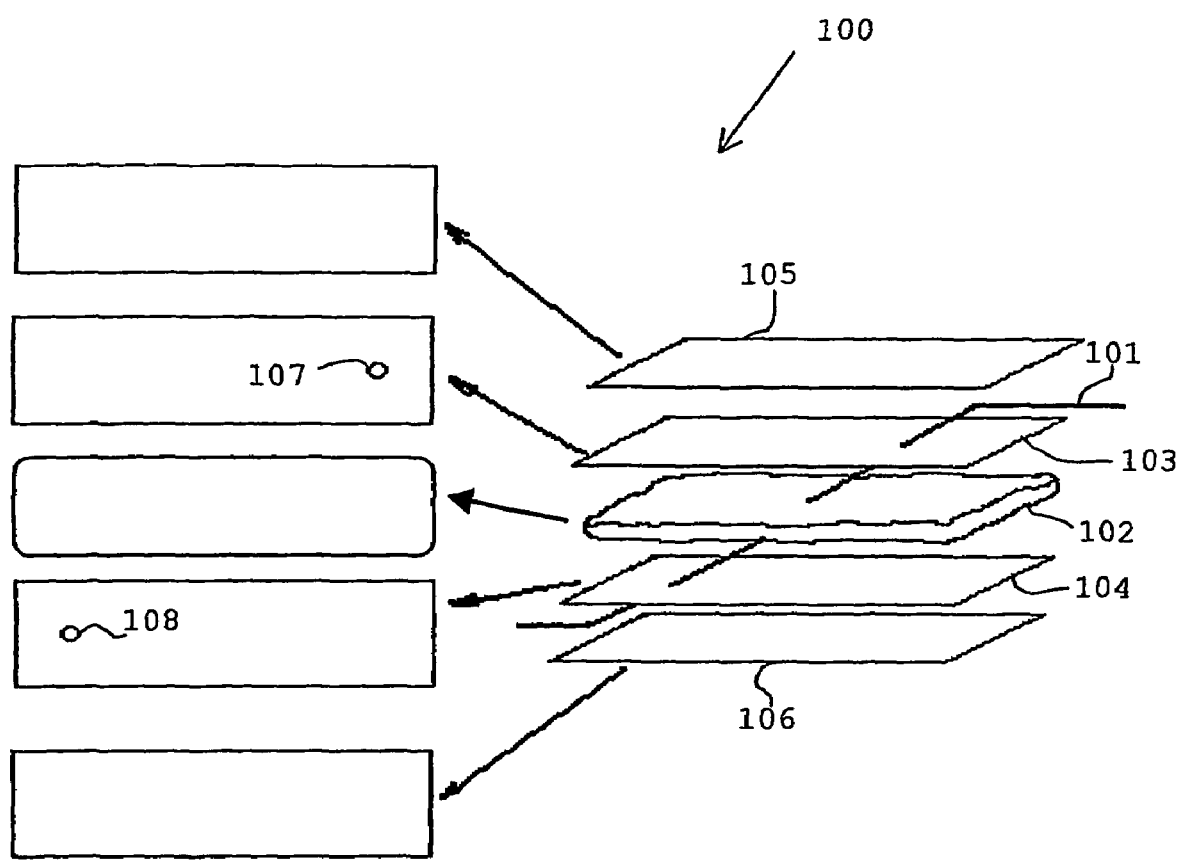
FIG. 1 shows an exploded view of the structure of the fiber optic shear force sensor according to the invention.

FIG. 1 shows an exploded view of the structure of a fiber optic force sensor 100 according to a preferred embodiment of the invention. The force sensor 100 comprises an optical fiber 101, a deformable layer 102, an upper anchoring layer 103, a lower anchoring layer 104, an upper protection layer 105 and a lower protection layer 106 wherein all the layers are arranged in a stacked arrangement.

In this preferred embodiment of the invention, the deformable layer 102 is an elastomer layer of silicon rubber, and the anchoring layers 103,104 and the protection layers 105,106 are carbon fiber composites.

The deformable layer 102 is embedded between the upper anchoring layer 103 and the lower anchoring layer 104. The anchoring layers 103,104 and the deformable layer 102 are in turn embedded between the upper and lower protection layers 105,106 in the manner as shown in FIG. 1.

A first hole 107 is provided in the upper anchoring layer 103, and a second hole 108 is provided in the lower anchoring layer 104. A first portion of the optical fiber 101 is threaded through the first hole 107, and a second portion of the optical fiber 101 is threaded through the second hole 108.

The first portion of the optical fiber threaded through the first hole 107 of the upper anchoring layer 103 towards the upper protection layer 105 is secured (or anchored) between the upper anchoring layer 103 and the upper protection layer 105. In the same way, the second portion of the optical fiber threaded through the second hole 108 of the lower anchoring layer 104 towards the lower protection layer 106 is secured (or anchored) between the lower anchoring layer 104 and the lower protection layer 106.

Figure 2:
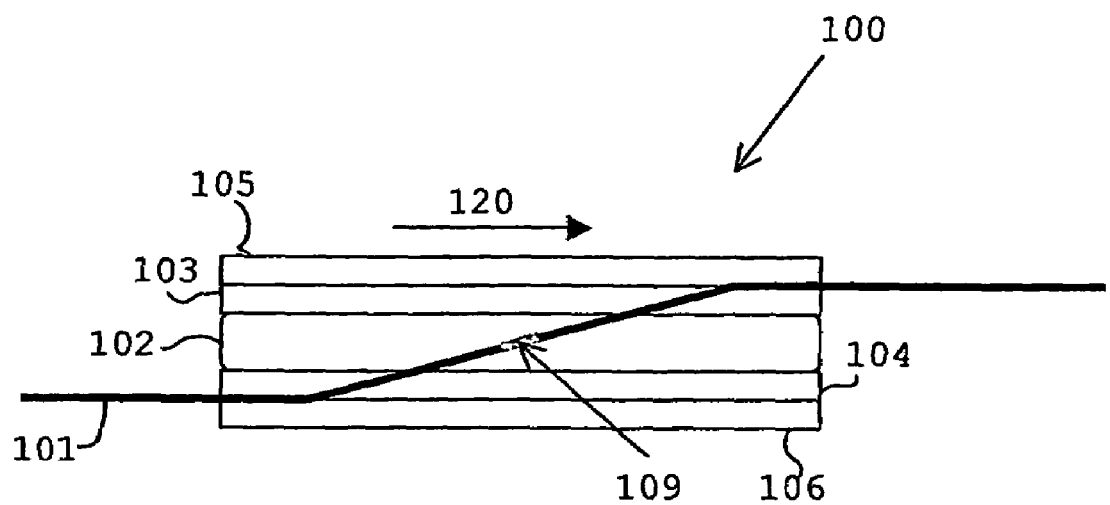
FIG. 2 shows a cross-sectional view of the fiber optic shear force sensor according to the invention.
Figure 3:
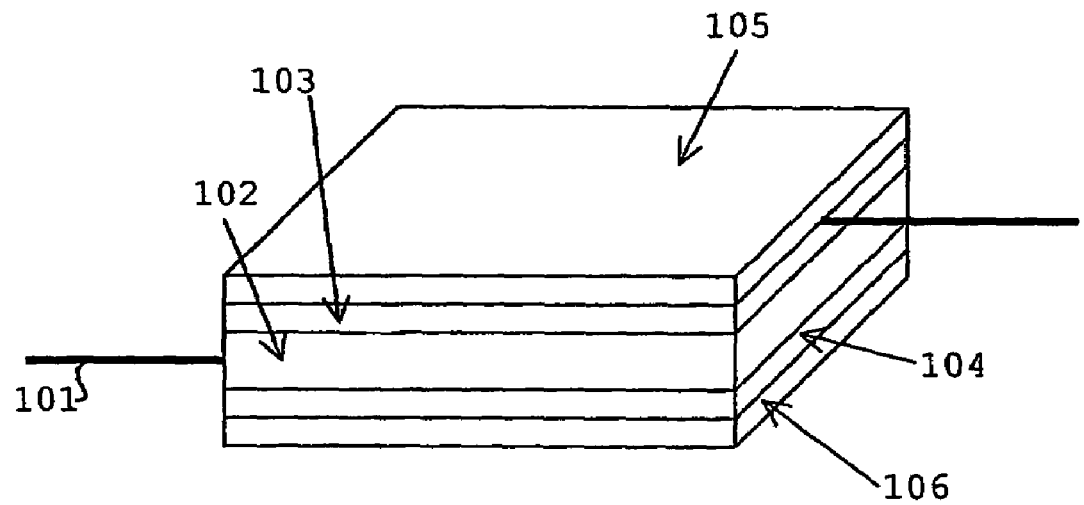
FIG. 3 shows a perspective view of the fiber optic shear force sensor according to the invention.

FIG. 2 and FIG. 3 show the force sensor 100 when the different components described in conjunction with FIG. 1 are assembled. The process of assembling the different components of the force sensor 100 involves curing the silicon rubber which is used for the deformable layer 102. The curing process causes the silicon rubber to harden and also to attach itself to the upper and lower anchoring layers 103,104.

During the curing process, the carbon fiber composites of the upper anchoring layer 103 also attaches itself to the upper protection layer 105, thereby securing the first portion of the optical fiber between these two layers. Similarly, the carbon fiber composites of the lower anchoring layer 104 also attaches itself to the lower protection layer 106, thereby securing the second portion of the optical fiber between these two layers.

Therefore, no glue or adhesives are needed to assemble the force sensor 100. However, adhesives like epoxy glue may be used for attaching the different components together if desired.

It can be seen from FIG. 2 that a Bragg grating 109 is incorporated into an intermediate portion of a fiber core (not shown) of the optical fiber 101 between the first and second anchored portions. In particular, the Bragg grating is arranged in the fiber core in a middle section of the intermediate portion of the optical fiber 101 in the deformable layer 102, and, therefore, is substantially at an equal distance from the upper and lower anchoring layers 103,104.

It can also be seen that the intermediate portion of the optical fiber 101 in the deformable layer 102 is arranged at an angle less than 90 degrees with respect to the planes of the protection and anchoring layers 103,104,105,106.

Figure 4:
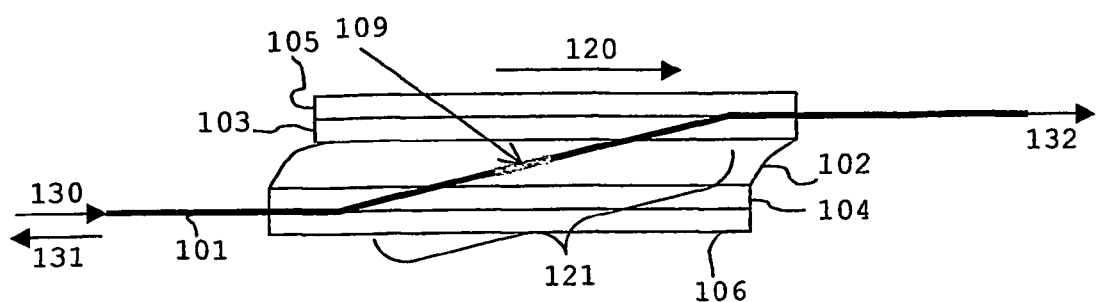
FIG. 4 shows a side view of the fiber optical shear force sensor wherein the deformable layer of the fiber optic force sensor according to FIG. 2 is deformed under an applied shear force.

When a shear force 120 is applied to the force sensor 100, the deformable layer 102 deforms in the direction of the shear force 120 as shown in FIG. 4. Since the first and second portions of the optical fiber 101 are anchored, the intermediate portion of the optical fiber 121 between the two anchored portions is stretched, resulting in a lengthening of the optical fiber 121 and, accordingly, of the Bragg grating 109 incorporated therein.

The lengthening of the optical fiber 101, and hence the Bragg grating 109, results in a change of the Bragg wavelength $\lambda_b$ of the Bragg grating 109. By supplying an input signal 130 to the optical fiber 101 and measuring the wavelength of a reflected signal 131 and/or transmitted signal 132, a wavelength shift corresponding to the change of the length of the optical fiber 101, and hence the magnitude of the shear force 120, can be determined.

Figure 5:
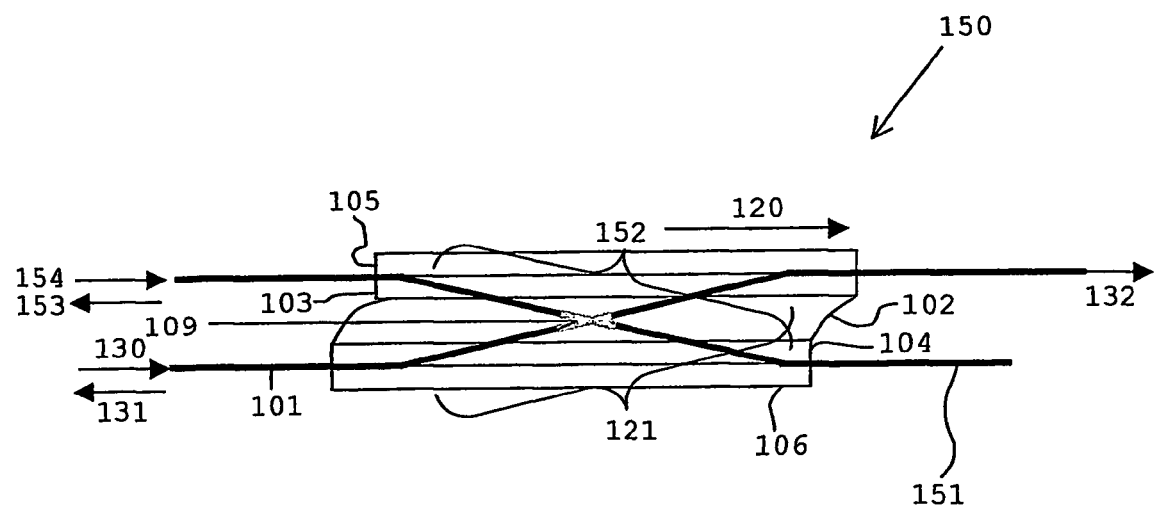
FIG. 5 shows a side view of the fiber optical shear force sensor comprising two separate optical fibers.

FIG. 5 shows an embodiment of the invention, wherein the force sensor 150 comprises a further optical fiber 152. When the shear force 120 is applied to the force sensor 150, the intermediate portion 121 of the optical fiber 101 is stretched wherein the intermediate portion 152 of the further optical fiber 151 is compressed. In this case, the reflected signal 131 corresponding to the reflected wavelength shift of the optical fiber 101 is used to determine the magnitude of the shear force 102.

However, when a shear force is applied in an opposite direction, the intermediate portion 152 of the further optical fiber 151 is stretched wherein the intermediate portion 121 of the optical fiber 101 is compressed. In this case, a reflected signal 153 corresponding to a reflected wavelength shift of the optical fiber 151 when an input signal 154 is applied to the optical fiber 151 is used to determine the magnitude of the shear force.

Figure 6:
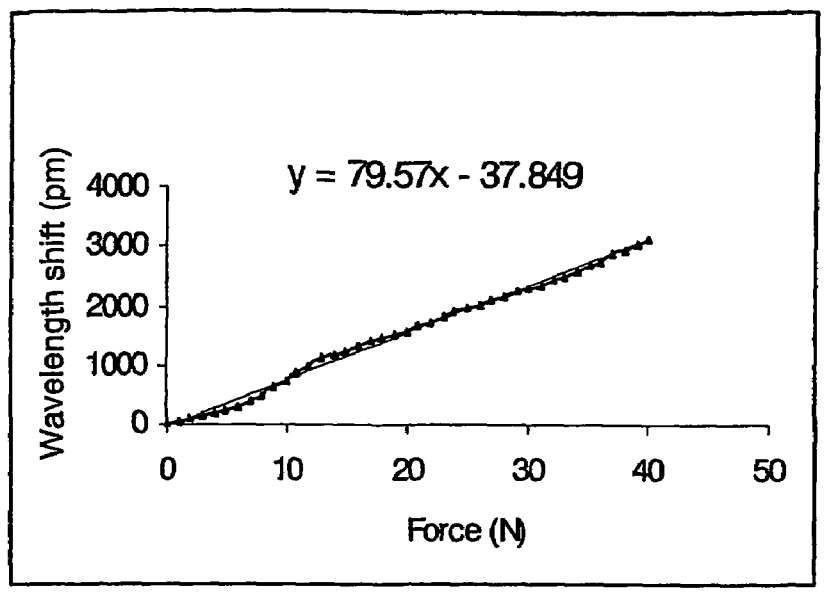
FIG. 6 shows a graph indicating the relationship between the wavelength shift of the sensor according to FIG. 1 and the shear force applied thereon.

A force sensor 100 according to FIG. 1 having a length of 5 cm, width of 2 cm, thickness of 0.1 cm and a Bragg grating length of 1 cm has been tested. The relationship between the wavelength shift of the Bragg grating 109 of the optical fiber 101 and the shear force 120 applied to the sensor is shown in FIG. 6.

Based on the test results, it can be seen that a good linear relationship exists between the wavelength shift of the Bragg grating 109 and the applied shear force 120. In other words, when the applied shear force 120 is increased, the wavelength shift of the Bragg grating 109 also increases in a linear manner.

Figure 7:
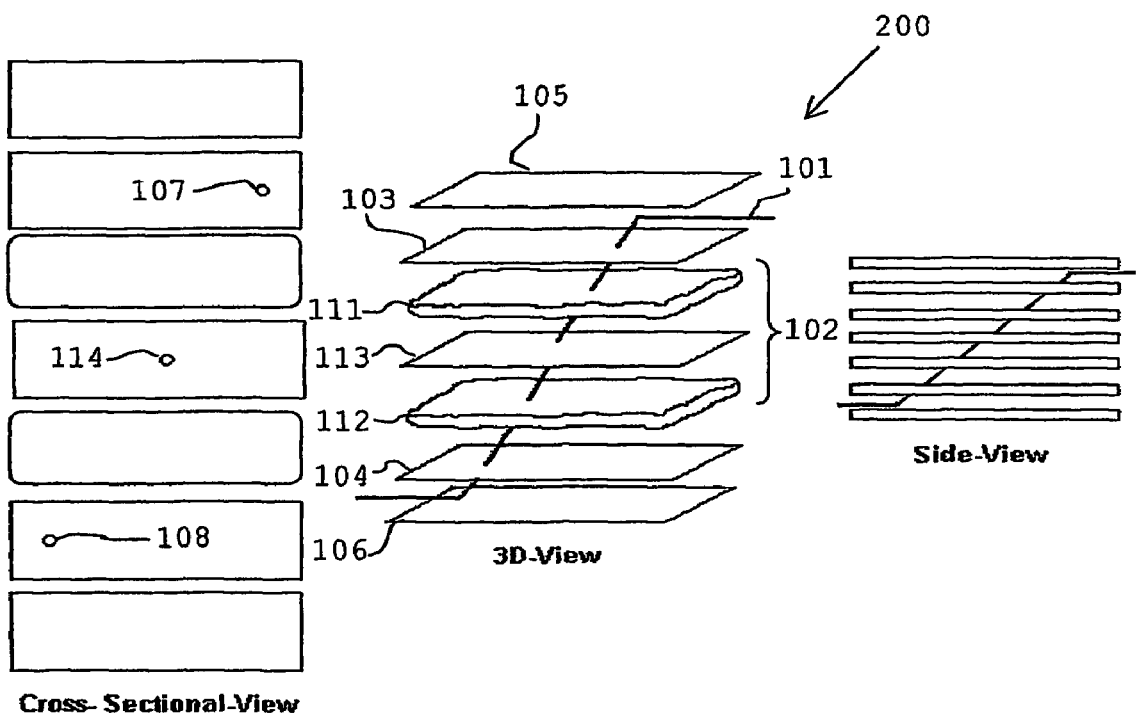
FIG. 7 shows an exploded view of the structure of the fiber optic force sensor having a multi-layered deformable layer structure according to an alternative embodiment of the invention.

FIG. 7 shows an exploded view of a force sensor 200 according to an alternative embodiment of the invention having a multi-layered deformable layer 102.

The deformable layer 102 of the force sensor 200 comprises a first elastomer layer 111, a middle partition layer 113 and a second elastomer layer 112. The elastomer layers 111, 112 are of the same thickness and comprise silicon rubber, and the partition layer 113 comprises carbon fiber composites. The partition layer 113 is embedded between the elastomer layers 111,112.

In addition to the first hole 107 and second hole 108 provided in the upper anchoring layer 103 and in the lower anchoring layer 104, respectively, a third hole 114 is provided in the partition layer 113. The optical fiber 101 is threaded through the first hole 107 of the upper anchoring layer 103, the first elastomer layer 111, the third hole 114 of the partition layer 113, the second elastomer layer 112 and finally through the second hole 108 of the lower anchoring layer 104.

According to this alternative embodiment, the Bragg grating 109 extends through the third hole 114 with its central portion lying in the third hole 114 within the plane of the partition layer 113.

The optical fiber 101 is only anchored between the upper anchoring layer 103 and the upper protection layer 105 as well as between the lower anchoring layer 104 and the lower protection layer 106. Since, the diameter of the third hole 114 through which the Bragg grating extends is larger than the diameter of the optical fiber 101 containing the Bragg grating 109, the silicon rubber of the first and second elastomer layers 111,112 fill up and surround the portion of the optical fiber within the third hole 114 during the curing process. Therefore, the optical fiber is prevented from being attached to the partition layer which would otherwise affect the change in length of the Bragg grating 109 when the shear force 120 is applied to the force sensor 200.

Since two elastomer layers are used, the force sensor 200 according to this alternative embodiment has a thicker deformable layer than the force sensor 100 according to FIG. 1, and hence higher sensitivity to a shear force 120.

Figure 8:
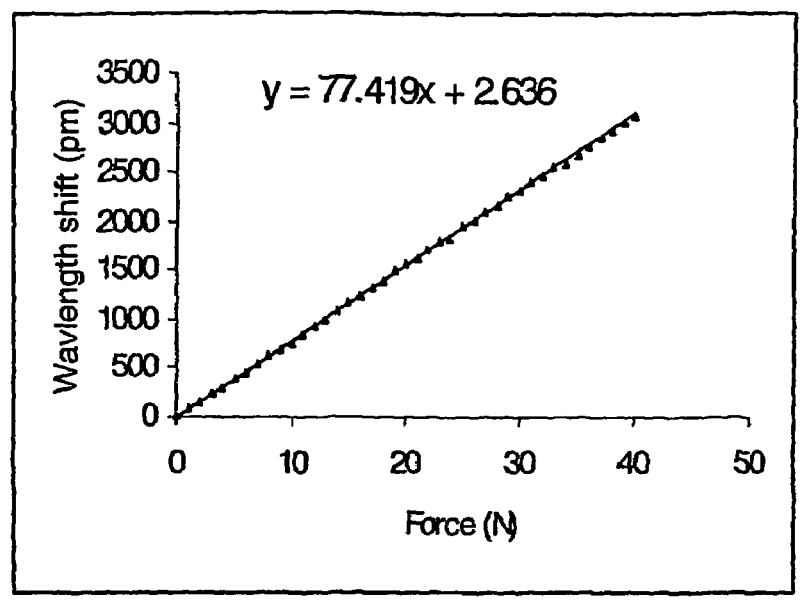
FIG. 8 shows a graph indicating the relationship between the wavelength shift of the sensor according to FIG. 2 and the shear force applied thereon.

A force sensor 200 according to FIG. 6 having a length of 5 cm, width of 2 cm, thickness of 0.1 cm and a Bragg grating length of 1 cm has been tested. The relationship between the wavelength shift of the Bragg grating 109 and the shear force 120 applied on the sensor 200 is shown in FIG. 8.

Based on the test results, it can be seen again that a good linear relationship exists between the wavelength shift of the Bragg grating 109 and the applied shear force 120. In other words, when the applied shear force 120 is increased, the wavelength shift of the Bragg grating 109 also increases in a substantially linear manner.

It should be noted that according to another embodiment of the invention more than two elastomer layers are used to achieve any other desired thickness and, therefore, sensitivity of the sensor. For example, the deformable layer 102 may comprise of three elastomer layers, with two partition layers alternately arranged between them.

According to another aspect of the invention, several force sensors may be provided on a single optical fiber to implement a fiber optic force sensor array according to the invention. In this case, a plurality of Bragg gratings, each having a different Bragg wavelength $\lambda_b$, is provided in each force sensor along the same optical fiber.

Each force sensor comprises a deformable layer embedding the Bragg grating of this sensor, a first stack of layers comprising an upper anchoring layer and an upper protection layer, and a second stack of layers comprising a lower anchoring layer and a lower protection layer. The first stack of layers is arranged above the second stack of layers, with the deformable layer embedded between them.

Thus, according to this aspect of the invention, multiple sensors are implemented on a single strand of optical fiber, and a single reflected and/or transmitted output signal corresponding to the wavelength shifts of all of the Bragg gratings results from one input signal. The output signal can be demultiplexed and read by a single decoder.

Such an arrangement in this embodiment can also be used to form a two-dimensional matrix sensor, wherein a two-dimensional mapping of the shear force can be obtained. In other words, the respective magnitude of the applied shear force at respective positions of an area can be determined by such a sensor arrangement.

Figure 9:
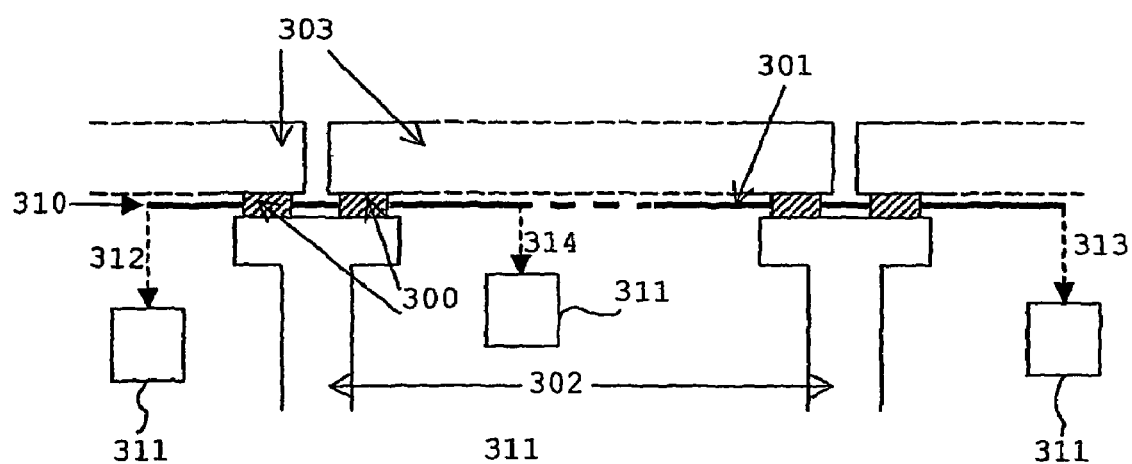
FIG. 9 shows an example of an application of a fiber optic force sensor array according to the invention.

FIG. 9 shows an example of an application the fiber optic force sensor array according to the invention.

A plurality of force sensors 300 is provided along corresponding sections of an optical fiber 301. The force sensors 300 are arranged on pillars 302 for measuring shear force of the concrete blocks 303 placed on the sensors 300 on the pillars 302. The shear force exerted on the sensors 300 may be caused by an expansion of the concrete blocks 303.

To prevent possible slipping between the upper protection layers of the sensors 300 and the concrete blocks 303, and/or between the lower protection layers and the pillars 302, adhesive (for example epoxy glue) may be used between the contacting surfaces.

To detect any wavelength shift of an input signal 310, input at one end of the optical fiber 301, caused by a change in length of any of the Bragg gratings due to shear force, a decoder 311 may be arranged either at the same end of the optical fiber 301 to receive a reflected output signal 312 or at the other end of the optical fiber 301 to receive a transmitted output signal 313 reflected or transmitted, respectively, by the Bragg gratings.

It is also possible according to the invention to have the decoder 311 arranged between any two Bragg gratings to tap the output signal 314 transmitted in that section of the optical fiber. In this case, the output signal 314 in that section of the optical fiber comprises both the transmitted and the reflected components of the input signal 301.

The output signal 314 is de-multiplexed by the decoder 311 to determine its wavelength components, and to compute any corresponding wavelength shifts, based on which the corresponding shear forces are determined.

While different embodiments of the invention have been described, they are merely illustrative of the principles of the invention. Other embodiments and configurations may be devised without departing from the spirit of the invention and the scope of the appended claims.

What is claimed is:

1. A fiber optic force sensor for measuring shear force, comprising:

an optical fiber comprising at least one fiber core having a fiber optical axis;

a Bragg grating being formed in a portion of the at least one fiber core of the optical fiber and having a grating optical axis coaxial to the fiber optical axis;

a first stack of layers comprising an upper protection layer and an upper anchoring layer; and a second stack of layers comprising a lower anchoring layer and a lower protection layer;

wherein the first stack of layers is arranged above the second stack of layers with the upper anchoring layer facing the lower anchoring layer, wherein a first portion of the optical fiber is threaded through a hole provided in the upper anchoring layer to be anchored between the upper anchoring layer and the upper protection layer, a second portion of the optical fiber is threaded through a hole provided in the lower anchoring layer to be anchored between the lower anchoring layer and the lower protection layer, and wherein the portion of the fiber core of the optical fiber comprising the Bragg grating is arranged between the anchored first and second portions of the optical fiber.

2. The fiber optic force sensor according to claim 1, wherein the upper and the lower anchoring layers comprise carbon fiber composites.

3. The fiber optic force sensor according to claim 1, wherein the upper and the lower protection layers comprise carbon fiber composites.

4. The fiber optic force sensor according to claim 1, further comprising a deformable layer arranged between the upper anchoring layer and the lower anchoring layer, wherein the deformable layer embeds the portion of the optical fiber comprising the Bragg grating.

5. The fiber optic force sensor according to claim 4, wherein the portion of the optical fiber comprising the Bragg grating is arranged in the deformable layer substantially at a same distance from the upper anchoring layer and the lower anchoring layer.

6. The fiber optic force sensor according to claim 4, wherein the deformable layer is an elastomer layer.

7. The fiber optic force sensor according to claim 6, wherein the elastomer layer comprises silicon rubber.

8. The fiber optic force sensor according to claim 4, wherein the portion of the fiber core of the optical fiber comprising the Bragg grating is arranged in the deformable layer such that it is inclined at an angle with respect to the planes of the anchoring layers.

9. The fiber optic force sensor according to claim 4, wherein the deformable layer comprises a first elastomer layer, a second elastomer layer and a partition layer, wherein the partition layer is embedded between the first elastomer layer and the second elastomer layer.

10. The fiber optic force sensor according to claim 9, wherein the portion of the optical fiber between the anchored first and second portions is threaded through a hole provided in the partition layer, and wherein a section of the optical fiber in the hole through the partition layer is surrounded by the material of the first and the second elastomer layers.

11. The fiber optic force sensor according to claim 10, wherein the first and the second elastomer layers have the same thickness, and the portion of the optical fiber comprising the Bragg grating is arranged such that the Bragg grating extends through the hole and lies with its central portion in the hole within the plane of the partition layer.

12. The fiber optic force sensor according to claim 9, wherein the first and the second elastomer layers comprise silicon rubber.

13. The fiber optic force sensor according to claim 9, wherein the partition layer comprises carbon fiber composites.

14. A fiber optic force sensor array for measuring a plurality of shear forces, comprising an optical fiber having at least one fiber core;

a plurality of Bragg gratings incorporated into the at least one fiber core of the optical fiber at a corresponding plurality of portions of the optical fiber, wherein the Bragg gratings and the fiber core each have an optical axis, wherein all of the optical axes are coaxial to one another, and at each Bragg grating, the sensor array comprises a first stack of layers comprising an upper protection layer and an upper anchoring layer; and a second stack of layers comprising a lower anchoring layer and a lower protection layer;

wherein the first stack of layers is arranged above the second stack of layers with the upper anchoring layer facing the lower anchoring layer, wherein a first portion of the optical fiber is threaded through a hole provided in the upper anchoring layer to be anchored between the upper anchoring layer and the upper protection layer, a second portion of the optical fiber is threaded through a hole provided in the lower anchoring layer to be anchored between the lower anchoring layer and the lower protection layer, and wherein the portion of the fiber core of the optical fiber comprising the Bragg grating is arranged between the anchored first and second portions of the optical fiber.

15. The fiber optic force sensor array according to claim 14, further comprising, at each Bragg grating, a deformable layer arranged between the upper anchoring layer and the lower anchoring layer, wherein the deformable layer embeds the portion of the optical fiber comprising the Bragg grating.

* * * * *